(12) United States Patent
Wen et al.

(10) Patent No.: US 8,446,550 B2
(45) Date of Patent: May 21, 2013

(54) AUTOMATIC DARKENING AND GLARE REDUCING LIQUID CRYSTAL MIRROR

(75) Inventors: Walter Y. Wen, Garland, TX (US); Robin Hines, Tullahoma, TN (US); Chai T. Chang, Upland, CA (US)

(73) Assignee: Glarenix USA, LLC, Atlanta, GA (US)

( * ) Notice: Subject to any disclaimer, the term of this patent is extended or adjusted under 35 U.S.C. 154(b) by 985 days.

(21) Appl. No.: 12/343,091

(22) Filed: Dec. 23, 2008

(65) Prior Publication Data
US 2010/0026917 A1   Feb. 4, 2010

Related U.S. Application Data

(60) Provisional application No. 61/085,921, filed on Aug. 4, 2008.

(51) Int. Cl.
*G02F 1/133* (2006.01)
(52) U.S. Cl.
USPC ............... 349/116; 349/113; 349/195
(58) Field of Classification Search ........... 349/113, 349/116, 195
See application file for complete search history.

(56) References Cited

U.S. PATENT DOCUMENTS

| | | | |
|---|---|---|---|
| 4,266,859 A * | 5/1981 | Togashi | ............... 349/177 |
| 4,664,479 A | 5/1987 | Hiroshi | |
| 4,669,825 A | 6/1987 | Itoh et al. | |
| 6,166,848 A * | 12/2000 | Cammenga et al. | ........... 359/267 |
| 2002/0057241 A1 * | 5/2002 | Oda et al. | ................ 345/87 |
| 2002/0140884 A1 * | 10/2002 | Richard | ................ 349/113 |
| 2002/0171792 A1 * | 11/2002 | Kubota et al. | ................ 349/114 |

OTHER PUBLICATIONS

CN 200910005423.1—First Office Action , Dec. 28, 2012, with translation.

* cited by examiner

*Primary Examiner* — Lucy Chien
(74) *Attorney, Agent, or Firm* — Womble Carlyle Sandridge & Rice, LLP

(57) ABSTRACT

An automatic darkening liquid crystal mirror for vehicles, the mirror having a transparent front substrate and a back substrate with a reflective or transflective mirrored coating. The front and back substrates are spaced apart to define a liquid crystal cell between the substrates that is filled with a liquid crystal fluid incorporating a dichroic dye. A conductive thin film is applied onto the interior surface of the front substrate, and the mirrored coating of the back substrate also is conductive. An alignment compound is deposited on opposite sides of and bounding the liquid crystal cell. An electronic control circuit is adapted to apply selectively a voltage signal to the conductive think film and the conductive mirrored coating to affect the transmittance of the liquid crystal fluid, and thereby the darkness of the mirror, in response to light intensity sensed by a headlight sensor coupled to the electronic control circuit.

6 Claims, 3 Drawing Sheets

AUTOMATIC DARKENING AND GLARE REDUCING LIQUID CRYSTAL MIRROR

REFERENCE TO RELATED APPLICATION

Priority is hereby claimed to the filing date of U.S. provisional patent application Ser. No. 61/085,921 filed on Aug. 4, 2008, and the entire contents of that provisional patent application are incorporated by reference.

BACKGROUND

For driving safety and comfort, it has long been necessary to control the reflectance of rearview mirrors in automobiles and other motor vehicles. At the driver's preference, the mirror reflectance can be altered from a highly reflective or "bright-mode" (BM) state to a less reflective "dark-mode" (DM) state. When other vehicles with bright headlights approach from behind at night, the rearview mirror is switched from its BM state to its DM state to minimize the headlight glare reflection from the rearview mirror since the annoying light intensity can hinder the driver's efforts to maneuver the vehicle safely. Conventionally, such adjustment was controlled manually by a mechanical lever that tilts the mirror reflecting angle slightly away from the driver. Later, the mechanical lever was controlled by electromechanical means, but still was done on demand by the driver. More recently, rearview mirrors are commercially available that automatically vary the reflectance of a mirror from BM to DM or vice versa using electrochromic (EC) tinting technology without having to move the mirror physically.

An EC mirror dims when a Direct Current (DC) is applied between the front and back electrodes of a mirror cell that contains a chemical electrolyte. The dimming mechanism is an electrochemical platting process that proceeds slowly. An EC mirror generally takes 6 to 10 seconds to change from its original BM to a less reflective deep green color in its DM. Due to the complex electrochemical platting processes with the EC technology, the response time depends critically upon mirror size. The larger the mirror's area, the longer it takes to alter the reflectance of the mirror. As a result, it is not practical to build a large EC mirror for applications such as commercial trucks. Furthermore, the electrical current requirement to change reflectance states of an EC mirror varies from 80 to 120 milliamperes. Due to this relatively high current consumption, EC mirrors in automotive applications must be wired directly to the main power source of the vehicle; i.e., the battery. Although deriving the power through the vehicle's battery may be acceptable for an Original Equipment Manufacturing (OEM) item, it is not viable for after-market mirrors where customers demand that the mirror be a self-sustained unit without any requirement of external wiring.

A need persists for an automatic darkening and glare reducing mirror that successfully addresses these and other shortcomings of the prior art. It is to the provision of such a mirror that the present invention is primarily directed.

SUMMARY

This invention relates generally to a glare reducing motor vehicle mirror that is constructed with a Liquid Crystal (LC) cell akin to technology used in a Liquid Crystal Display (LCD). The LC mirror cell is composed of two slightly spaced apart panel substrates, which preferably are made of glass. The front or exposed panel substrate is clear and transparent while the back panel substrate is opaque and reflective or transflective to form a mirrored surface instead of another transparent substrate as found in a regular LCD. A transflective mirror material allowing some light to pass through is desired when displays such as temperature or compass displays are installed behind the mirror. A LC fluid with a dichroic dye mixture is enclosed in the mirror cell between the front and back panels for affecting the light reflectance of the mirror. More specifically, light must traverse the LC fluid with its dichroic dye mixture as it passes through the front panel and is reflected by the back panel. If the molecules in the LC fluid are oriented parallel to the mirror surface, then the fluid is less transparent and the mirror is darkened. Conversely, if the molecules are oriented perpendicular to the mirror surface, then the fluid is more transparent and the mirror is lightened. A BM embodiment is normally in its bright-mode when no power is applied and a DM embodiment is normally in its dark mode. An Ultraviolet (UV) protective coating of inorganic or organic material, or an UV protective polymer film on the exposed surface of the front panel prevents the LC-dye mixture from degrading due to extended exposure of the mirror to sunlight. An antireflective (AR) optical thin film coating is deposited atop the UV coating or the UV polymer film on the front panel to reduce unwanted reflection from the exposed surface of the mirror.

The LC mirror is a field-effect device that operates under the influence of an electrical field. When coupled with and controlled by a custom-designed light sensing electronic control system, which also is a part of the invention, the LC mirror can switch automatically and very quickly from a highly reflective BM to a less reflective DM, or vice versa. The LC mirror cell can be fabricated with glass, plastics, or any transparent substrate that can be made into a mirror. Also, the LC mirror can be made flat or curved with a neutral black, blue, or other DM color tint. For automotive applications, the LC mirror can be connected to and operated on the main power source already available in a vehicle. However, due to its extremely low power consumption, the LC mirror also can be configured as a self-sustained after market clip-on mirror powered by internal dry cells, rechargeable batteries of the same, or solar cells. Furthermore, the LC mirror can have built-in temperature and/or compass and/or clock and/or bluetooth and/or garage opener and/or tire pressure indicator and/or other types of graphic displays or indicators, as well as integrated backup camera displays and the like. To eliminate power consumption when not in use, a miniature switch can be incorporated to turn the power on or off as needed. A micro switch can be installed in the clip-on embodiment so that power is not applied to the mirror system until it is clipped onto an existing mirror in a vehicle. For further energy savings, the power input to the Clip-On LC mirror also can be monitored using a motion or pressure detector to interrupt the power when no operator is on the driver's seat and/or the vehicle is not in motion.

The electric current requirement of the LC mirror, which is directly related to its power consumption, is in micro-amperes, at least three orders of magnitude less than that of a prior art EC mirror. The time required for the LC mirror to change states from BM to DM is in milliseconds, three orders of magnitude faster than time required for a prior art EC mirror to change states. There is no color shift for the LC mirror as it changes from BM to a less reflective neutral black DM or vice versa. Prior art EC mirrors, by contrast, shift through a color band during the several seconds required to change states before settling at a deep green color tint. Also, mirror size is not a limiting factor for the LC technology of the present invention. Further, a BM LC mirror can revert quickly to BM if the power is removed suddenly, while a prior art EC mirror takes more than 10 seconds to switch when the power is completely lost for whatever reason. As a public safety concern, the U.S. Department of Transportation (DOT) has determined that an electrical dimming mirror for motor vehicles must quickly and automatically revert to a BM state in case of power failure, which is readily accomplished with the BM mirror embodiment of the present invention. Because the LC mirror is an electrical field effect device, it can stay in its DM state practically for an indefinite length of time without degradation in performance.

Thus, an improved dimming automotive mirror is now provided that, among other advantages, switches from its BM to its DM or vice versa virtually instantaneously, that consumes very little electrical power and thus can be operated on internal batteries, and that is not limited to small surface area mirrors. The invention will be better understood upon review of the detailed description set forth below taken in conjunction with the accompanying drawing figures, which are briefly described as follows.

DETAILED DESCRIPTION

Figure 1:
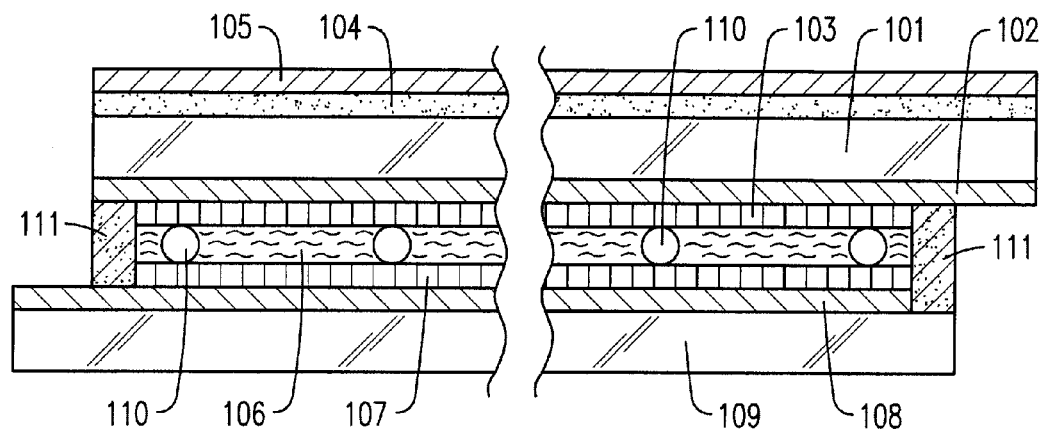
FIG. 1 is a cross section showing one configuration of an LC mirror according to principles of the invention.

Prior to a detailed discussion of the invention with reference to the figures, several aspects of the mirror system of the invention and of its electronic control system will be described to clarify the detailed description that follows. These aspects include the various components of the LC chemical system, and the mirror control electronics.

1. LC Chemical System

The performance of the LC mirror of the invention depends on the chemical system, which includes the nature and properties of the alignment compound for the LC molecules and its closely related to the LC material formulation. The specific LC fluid with dichroic dyestuffs works in harmony with the alignment compound that has been developed. These two materials must be compatible and incorporate well to establish the required LC molecule orientation for maximum optical performance. With the LC technology described herein, two types of LC mirrors can be constructed. The first type is a DM mirror that normally is at its lowest reflecting DM state and changes to its highest reflecting BM state only when an alternating current (AC) voltage signal is applied across the LC fluid. The second type is a BM mirror that normally is at its highest reflecting BM reflective state and changes to the lowest reflecting DM state only when an AC voltage signal is applied across the LC fluid.

1.1 Alignment Compound

The LC molecule orientation is different with the two different mirror types. In the DM mirror, the normal orientation of the LC molecules, i.e. their orientations without a voltage signal applied, is in a homogeneous configuration with the molecules aligning substantially parallel to mirror substrates. In contrast, the normal orientation of the LC molecules in the BM mirror is in a homeotropic configuration with the molecules aligning substantially perpendicular to the mirror substrates.

For the DM mirror, the homogeneous alignment compound may be but is not limited to Methyl Cellulose, Polyvinyl Alcohol, or Polyimide (PI) materials. In conventional LCD manufacturing, the alignment compound is composed of 1-6% PI in N-Methyl Pyroridone (NMP) or other appropriate organic solvent. The alignment compound is usually applied onto the surfaces of the glass substrates that bound the gap by roller coating or screen printing methods.

The LC molecules in the BM mirror normally are in a homeotropic orientation substantially perpendicular to the cell walls, which is not a common orientation for a traditional LCD product. The homeotropic alignment can be established by materials including, but not limited to, Quilon chrome complexes by Du Pont or sputter coating of a silicon-oxide thin film. In the current invention, organic compounds with aliphatic linear carbon side chains or chains of but not limited to C4-C30 are used as the alignment compound at a concentration of, but not limited to, 1-6% solution in a solvent such as Isopropyl Alcohol (IPA), Propanediol, Propylene Glycol Monoethyl Ether Acetate, or other appropriate organic solvent. The alignment material of this invention is planted and anchored onto the mirror cell surfaces instead of forming a polymer network layer as in the conventional LCD alignment method. The alignment compound can be formulated for various application techniques including dipping, flowing, screen printing, roller coating, off-set printing, or other techniques.

1.2 Liquid Crystal Fluid

For the DM mirror embodiment of the invention, wide temperature range (−40 to +120° C.) LC compounds of but not limited to static drive fluids with drive voltage from 1.5 to 5.0 V AC can be used as starting components for the LC fluid formulation. These materials are commercially available from EM Industries or other LC producers worldwide. However, it may be necessary to fine tune the material formulations for specific applications.

For the BM mirror, LC compounds with a negative dielectric anisotropy $\Delta\epsilon$ of −3 to −6 or lower are preferred. This negative dielectric LC material is needed for the LC molecules to rotate and align themselves from their normally perpendicular orientations to parallel orientations when an AC voltage signal is applied across the front and back electrodes of the mirror cell creating an electric field. The higher the absolute value of the negative dielectric anisotropy constant $\Delta\epsilon$, the lower the drive voltage needed to change the mirror reflectance.

1.3 Dichroic Dye

The dichroic dyestuffs are high molecular weight organic compounds with rod shape molecular structures. Red, blue and yellow dyes are three basic colors in the present dye formulations. Other colors such as purple, brown, pink, etc. also may be used. Azo and light stable anthraquinone dyes with high solubility in the LC compounds are most useful for application in the present invention. The order parameter that defines the orientation of the dye molecules against the LC molecules is preferred to be in the range of 0.7-0.9. The higher the order parameter number, the better the contrast ratio for the LC mirror. It must be noted that the order parameter is specific to the LC-dye pair and must be established by empirical measurements.

The individual dye composition in the LC formulation varies from 0.1 to 4.5%, depending on the color requirement including, but not limited to, black and other colors. The overall dye composition in the LC formulation for DM or BM mirror is 0.8 to 4.5% as determined by the required LC types and color saturation. If dye composition is oversaturated in the dichroic LC fluid, dyes can recrystallize out, which can cause undesirable results.

2. Mirror Control Electronics

The LC mirror control electronics comprise a printed circuit board (PCB) containing but not limited to two photo detectors and other components as needed for monitoring ambient light, headlight intensity, and for controlling the mirror reflectance in automatic response. The first photo detector is an ambient light sensor (AS), which is aimed in the travel direction of the vehicle or any other direction that is not rearward. The AS is in control during daytime to prevent the mirror from dimming in daylight. The second is a headlight sensor (HS) directed toward the back of the vehicle to monitor headlight intensity of a trailing vehicle at nighttime. When the ambient light detected by the AS falls below a preset level, indicating darkening ambient conditions, the HS becomes the controlling sensor to alter the reflectance of the mirror in response to bright headlights from behind that exceed a preset intensity level. The mirror control electronics can be powered by connecting the LC mirror to the existing main power source of a vehicle for OEM mirrors, or can be powered by internal batteries.

As mentioned, the mirror control electronics also can be powered by typical electronic instrument or equipment type batteries or cells, or rechargeable batteries, independent of the main power source of the vehicle. This allows the LC mirror to be built into a self-sustained device feasible for aftermarket consumer application. A dry-cell battery operated LC mirror can be readily clipped onto an existing interior rearview mirror of a vehicle. With proper tooling, exterior mirrors also can be readily built into similar clip-on configurations for various model vehicles. With an OEM application, power consumption is of no concern since the power comes from the existing source of the vehicle. For a Clip-On LC mirror using dry cell batteries, power consumption becomes an important factor.

Referring now in more detail to the drawing figures, FIG. 1 shows, in cross section, the configuration of a LC mirror that embodies principles of the invention in a preferred form. The LC mirror is constructed with two flat (or curved) substrates such as glass or plastic panels. The mirror front substrate 101 is a clear or transparent panel deposited with a transparent electrical conductive thin film 102, including, but not limited to, an Indium-Tin Oxide (ITO) coating. An organic alignment coating 103 for LC alignment is deposited over the conductive thin film 102 as shown. An UV protection coating or a polymer film 104 is deposited or laminated on the opposite or exposed surface of the substrate 101. This UV coating may comprise an inorganic optical thin film or an organic coating formulated with UV absorption agents such as, but not limited to, Tinuvin compounds by Ciba Specialty Chemicals Corporation or Uvinul materials available from BASF Corporation, in a proper polymer resin as the base of the coating. The UV protective polymer film can be but is not limited to the products of Nanofilm Co., Ltd., Korea. An AR optical thin film 105 of, but not limited to, an inorganic type is deposited over the UV coating 104 to reduce the front surface reflectance of the substrate 101. Such AR coatings are commercially available and adapted to the present application. Also, an UV protective polymer film with an AR topcoat is currently available from Nanofilm.

The back substrate 109 may be the same as the front substrate 101, but with a highly reflective or transflective thin film 108, including but not limited to a hybrid coating of ITO and/or silicon-oxide and/or titanium-oxide silver or an enhanced aluminum thin film. The LC alignment coating 107, which is the same as coating 103, is deposited over the mirrored surface 108. A mirror cell gap is defined between the front and back substrates. A LC fluid 106, which carries light screening dichroic dyes according to the invention, is contained in the mirror cell between the front 103 and back 107 alignment coatings applied on the surfaces of the substrates. The mirror cell gap is maintained by spacers 110 in the range of, but not limited to, 3-12 microns and sealed by adhesive seal 111.

Figure 2:
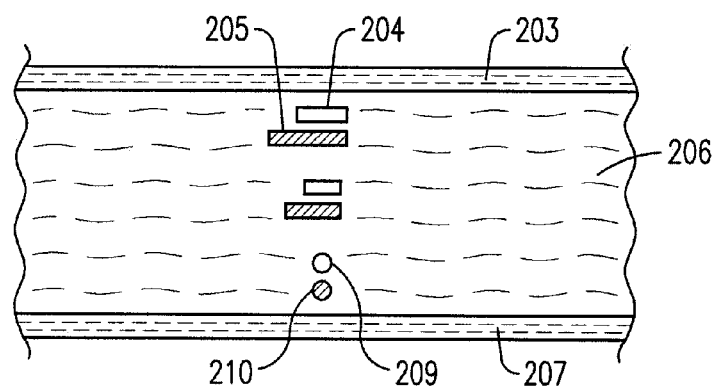
FIG. 2 illustrates molecule orientation in a Dark-Mode or DM mirror cell filled with LC fluid and a dichroic dye mixture.

FIG. 2 is a cross section of a cell portion of a dichroic LC DM mirror showing alignment coatings 203 on the front substrate and 207 on the back substrate, LC fluid 206, and representations of LC host molecules 204 and guest dye molecules 205. Adjacent to the mirror front substrate, the LC host molecules 204 orientate themselves generally parallel to the surface of the alignment coating 203, which has been mechanically buffed in a defined direction. The guest dichroic dye molecules 205 take a piggyback ride position with the host LC molecules 204. A similar alignment relationship but with a perpendicular orientation relative to molecules adjacent to the front substrate is established for the LC and dye molecules 209 and 210 at the mirror back alignment coating 207, which is mechanically buffed in a direction 90 degrees clockwise or counter clockwise relative to the top alignment coating 203 depending on the viewing characteristics as desired. With this alignment configuration, the LC mirror is normally at a DM state when not activated because the combined light blocking area presented by the dye molecules in a direction parallel to the mirror surfaces is substantially maximized.

Figure 3:
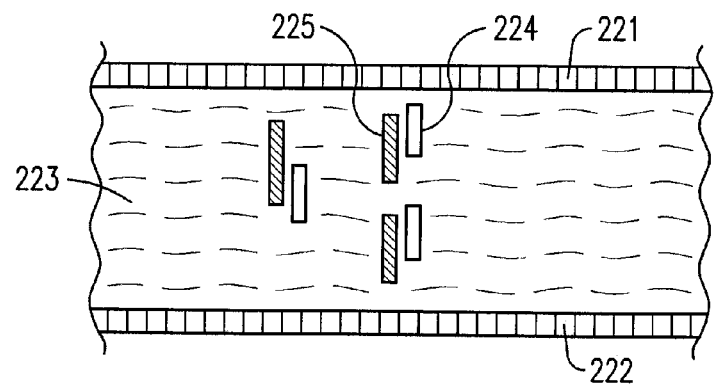
FIG. 3 illustrates molecule orientation in a Bright-Mode or BM mirror cell filled with LC fluid and a dichroic dye mixture.

FIG. 3 is a cross section of a similar cell portion of a dichroic LC BM mirror according to an alternate embodiment. In this embodiment, the LC host molecules 224 and dye molecules 225 align themselves substantially perpendicular to the wall surfaces as directed by the specific alignment coating 221 on the front and 222 on the back of the mirror cell. With this alignment configuration, the LC mirror is normally at a BM state when not activated as the light blocking area presented by the dye molecules in a direction perpendicular to the mirror is substantially minimized.

Figure 4:
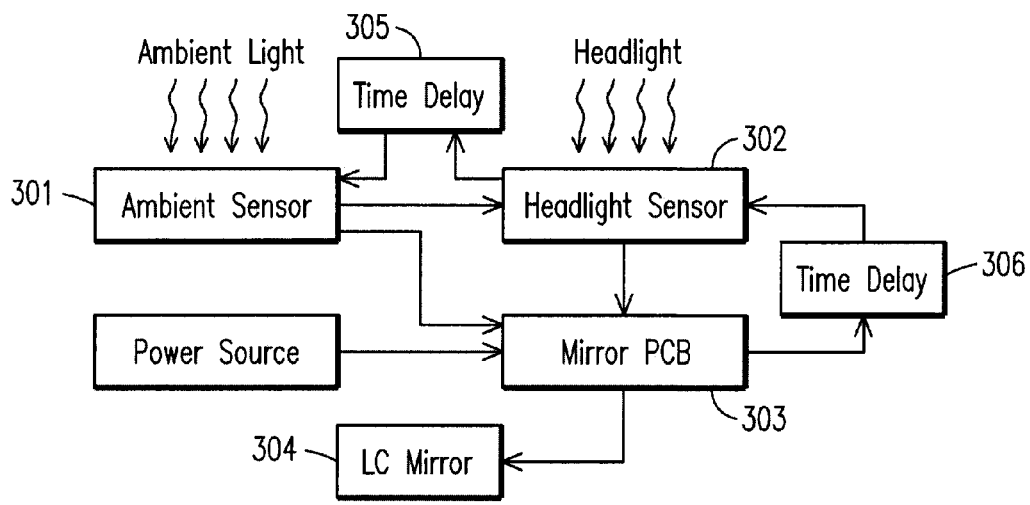
FIG. 4 is a schematic block diagram of the LC mirror electronics.

FIG. 4 is a functional block diagram of an LC mirror electronic control system according to the invention. As discussed above, the reflectance of the LC mirror is determined by the orientation of the LC and dye molecules 204 and 205 in FIG. 2 for the DM mirror and 224 and 225 in FIG. 3 for the BM mirror. The mirror reflectance is changed by altering the phase relationship and strength of a square wave voltage signal applied across the inside front transparent conductive coating electrode 102 and the back reflective or transflective surface electrode 108 of the mirror cell in FIG. 1. As the voltages across the front 102 and back 108 electrodes in FIG. 1 are in phase, the mirror is in its most reflective BM state. When the front and back voltages are $\pi$ radians or 180 degrees out of phase, the mirror is at its least reflective state DM. The mirror reflectance increases as the out-of-phase voltage is reduced toward an in-phase state.

A control strategy and system is required to determine when, the amount, and the phase of the voltage applied to the mirror electrodes that cause the mirror to become less reflective and thus reduce the glare reflection from the headlights of a trailing vehicle. The detection system should first determine if the ambient lighting indicates either a daytime or nighttime condition. Then the system should determine, at night only, when vehicles with bright headlights are approaching from behind and whether the incident light from the vehicle's headlights is sufficient to interfere with the vision of the driver. Additional enhancements to these two conditions and the control strategy also have shown to improve the LC mirror operation.

Referring to FIG. 4, the photo detector system of the preferred embodiment is operated according to the following logic. When the ambient light sensor (AS) 301 detects a light level higher than a preset threshold value, the headlight sensor (HS) 302 is disabled and the mirror remains in its bright mode state for either the DM or BM mirror. HS 302 is enabled when AS 301 detects a light level equal to or less than the preset threshold value, indicating that it is approaching nighttime, nighttime, or a low ambient light level equivalent to nighttime. Then, when HS 302 detects a headlight intensity equal to or higher than a preset threshold level, the mirror control circuit 303 will dim the mirror 304 to its least reflective DM state and return it to its BM state as the headlight brightness is reduced to lower than the preset threshold level. The light level or threshold of HS 302 preferably is preset at the same level as that of the AS 301 to reduce the length of dusk or dawn time period that usually lasts approximately 15 to 30 minutes depending on seasons of the year, the latitude, and the direction of travel. On the other hand, during the dusk or dawn time period, the mirror will stay at DM if the preset light level of HS 302 is lower than that of AS 301 as the ambient light will turn the mirror to the DM state.

There are criteria for the photo sensing system, i.e. the ambient and headlight sensors, of the present invention, particularly regarding setting the threshold level for the ambient light sensor 301. If the sensitivity of AS 301 is set too low (i.e. it responds to a brighter or more intense lighting condition), the mirror will be dimmed prematurely before it is sufficiently dark outside. If it is set too high (i.e. it responds to a darker or less intense lighting condition), the mirror will not begin to darken in response to headlights from behind until later in the evening when it becomes very dark. The preferred setting for the ambient light sensor should be a light intensity level indicative of approximately 15 minutes before sunset when most motor vehicles have their headlights turned on. In the present invention, the light sensing function primarily is controlled by the ambient light sensor. If the sensitivity of AS 301 is set too high and the sensitivity of HS 302 is set even higher than that of AS 301, the mirror will not dim on bright headlights until the ambient light level is equal to or lower than the preset level of AS 301. In such instances, the mirror will not function as darkness approaches. If the sensitivity of HS 302 is set lower than that of AS 301, the mirror will start to dim prematurely before sunset. It has been found that the best scenario is to set the sensitivity of HS 302 approximately the same as that of AS 301. With both AS 301 and HS 302 set at about the same light level, the mirror will dim in response to headlights from behind as soon as AS 301 enables HS 302 at the preset ambient light threshold, preferred to be indicative of about 15 minutes before sunset. As darkness deepens and the ambient light level becomes lower than the preset level of HS 302, the mirror will start to function normally. There may be a short time period of several minutes during which the mirror may be darkened due to ambient light instead of headlights from behind. To minimize the effects of the dusk/dawn transitions with the ambient sensor, a slight hysteresis is included in the sensor comparator circuits.

When a vehicle goes under highway bridges or through shaded areas during daytime under low overcast conditions, AS 301 can enable HS 302 which in turn may be triggered by the ambient light level to dim the mirror irregularly or intermittently depending on the speed of the vehicle. Using low power consumption capacitors for energy conservation, a time delay (TD) function 305 is built into the control circuit 303 for the ambient sensor to establish a 1-4 second time delay before the mirror switches from DM to BM to reduce irregular dimming or flickering of the mirror. A similar TD function 306 also is built into headlight sensor 302 to prevent the mirror from flickering when headlights of an approaching vehicle do not cast a steady light, such as when driving on uneven pavements when followed by a bright headlight or high beam. The TD feature of the ambient sensor is to reduce flickering of the mirror during daytime driving in low overcast environments and that of the headlight sensor is to minimize flickering when driving on uneven pavements and/or under heavy traffic conditions. Also, the comparator hysteresis minimizes the flicker effect.

Details of electronic control schemes vary slightly for the DM and BM mirror embodiments, the primary differences being summarized as follows:

Dark-Mode Mirror

A DM mirror is at its lowest reflective state when not activated, i.e. when no control voltage is applied to the electrodes. The mirror switches to BM only when the AS 301 enables the HS 302, and only when HS 302 detects a light level higher than its preset threshold, which causes the mirror control circuit 303 to switch the mirror 304. As control board 303 is enabled, it generates an out-of-phase square wave AC voltage across the front and back electrodes to alter the reflective mode of the mirror 304 from its original DM to the more reflective BM state.

When the ambient light level is below the preset threshold of AS 301, control circuit 303 enables HS 302. As HS 302 is enabled, but the light level of trailing headlights is nevertheless below the preset level of HS 302, control circuit 303 is enabled and the mirror 304 is switched to its most reflective BM state. When HS 302 is enabled and the light level is above its preset level, control circuit 303 disables the mirror 304 and returns it to the original lowest reflective DM state. It will thus be seen that the glare reflection of the mirror is reduced as a vehicle approaches from behind at night with bright headlights or high beams.

Bright-Mode Mirror

A BM mirror is at its highest reflective state when not activated. The mirror switches to DM only when AS 301 enables HS 302 and only when HS 302 detects a light level higher than its preset threshold, which causes the mirror control circuit 303 to switch the mirror 304. More specifically, the control circuit 303 generates an out-of-phase square wave voltage across the front and back electrodes of the LC cell to alter the reflective mode of the mirror 304 from its original BM to the less reflective DM state.

When the ambient light level is below the minimum threshold of AS 301, control circuit 303 enables or transfers control to HS 302. As HS 302 is enabled and the light level from headlights of a trailing vehicle is above the HS 302 preset threshold, control circuit 303 applies the AC voltage and the mirror 304 is switched to its less reflective DM state. When HS 302 is enabled and the light level of trailing headlights is below its preset threshold, control circuit 303 disables the mirror 304 by discontinuing the voltages applied to the electrodes, and returns the mirror to the original more reflective BM state. It will thus be seen that the glare reflection of the mirror is reduced as a vehicle approaches from behind with bright headlights or high beams.

Figure 5:
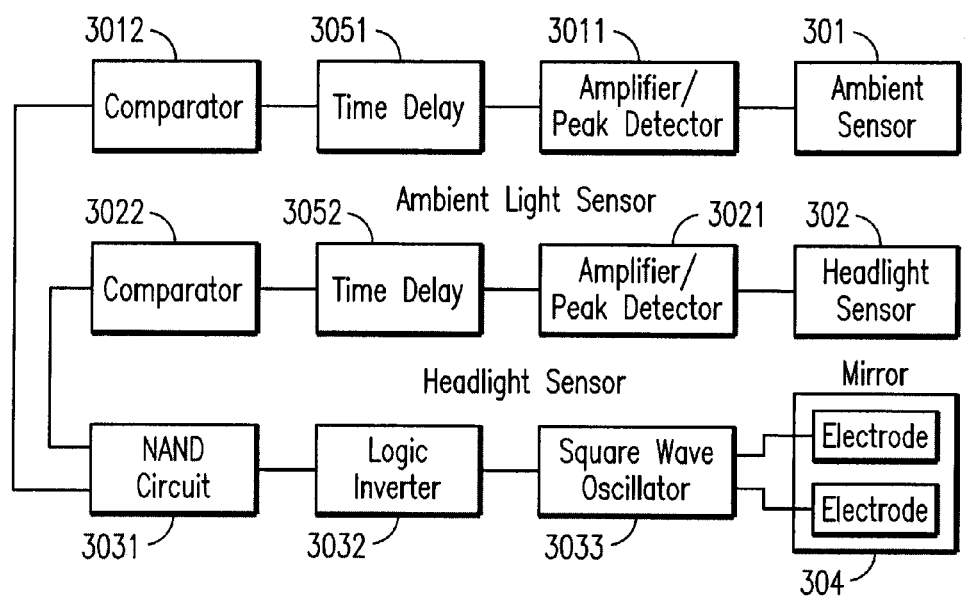
FIG. 5 is a schematic block diagram of an LC mirror control circuit according to the invention.

FIG. 5 is an LC mirror control circuit functional schematic block diagram according to the invention. The two amplifier/peak detectors 3011 and 3021 have output voltages that are directly proportional to the incident light levels impinging upon the AS 301 and the HS 302, respectively. These output voltages, rapid variations or "flickering" of which are effectively filtered out by time delays 306 and 305, are admitted to voltage comparators 3012, and 3022, respectively. The bias voltage on the ambient comparator 3012 is set on the positive input slightly higher than the voltage output of amplifier/peak detector 3011 for dark conditions. In this way, the output voltage of the ambient comparator 3012 is at a logic level high when there is no or insufficient light incident upon AS 301, and the output of the ambient comparator 3012 is a logic level low when light of sufficient intensity is incident upon AS 301. A time delay function 3051 of 2-10 seconds is implemented to reduce flickering of the mirror during times when the ambient light level is at or close to the preset threshold, which can cause rapid fluctuations in the output of the amplifier/peak detector 3011.

Similarly, the bias voltage on the headlight comparator 3022, is set on the negative input slightly higher than the output voltage of amplifier/peak detector 3021. Thus, the output of the headlight comparator 3022 is at a logic level low when there is no or insufficient light incident upon headlight sensor 302 and the output of the headlight comparator 3022 is logic level high when sufficient light is incident upon headlight sensor 302. A similar time delay function 3052 of 2-10 seconds is added to reduce flickering of the mirror during times when the intensity level of trailing headlights is close to the preset threshold.

The outputs of comparators 3012 and 3022 are the inputs to a two input NAND gate circuit 3031. The output of this NAND gate circuit 3031 is low only when both inputs are in a logic level high, and is high when either or both comparator outputs are at logic low. The only condition in which both comparator outputs are high is when AS 301 and amplifier/peak detector 3011 indicate ambient lighting conditions are dark, i.e. the voltage signal of AS 301 is below the setting of the peak detector, and HS 302 and its amplifier/peak detector 3021 indicate that there are headlights from behind with an intensity greater than a predetermined threshold, i.e. the voltage signal of HS 302 is above the setting of the peak detector.

The output of the NAND circuit 3031, is inverted by a NAND gate configured as a logic inverter 3032, such that when both comparator 3012, and 3022 outputs are high, the output of the logic inverter 3032 is high.

Two additional NAND gates are configured as a square wave oscillator 3033, with an output frequency set to drive the liquid crystal mirror 304 to lower the reflectivity of the mirror and not appear as a flicker. Typically, this frequency is from about 30 to about 60 Hz, although other frequencies are possible and within the scope of the invention. The oscillator 3033 is in operation only when the output of the inverter 3032 is high and the oscillator 3033 is low or off when the logic inverter 3032 output is low. It will thus be recognized that with the circuit of FIG. 5, a square wave voltage signal is applied to the mirror only when the ambient sensor indicates sufficient ambient darkness and the headlight sensor indicates sufficient brightness from behind. Oscillator operation is given in the truth table below with typical supply current requirements for the four conditions.

| | Ambient Sensor | Headlight Sensor | Oscillator Condition | Current micro-amperes |
|---|---|---|---|---|
| Daylight No Headlight | Low | Low | Off | 30 |
| Daylight with Headlight | Low | High | Off | 40 |
| Night No Headlight | High | Low | Off | 40 |
| Night with Headlight | High | High | On | 250 |

Some or all of the electronic functions described herein can be performed by a microprocessor, a FPGA (field programmable gate array), an ASIC (application specific integrated circuit), or other type of electronic circuit. The embodiment described is for a two-state operation between either maximum reflection or reduced reflection to reduce glare. However, the amount of reflection and glare reduction also can be controlled between these two discrete levels by varying the duty cycle of the applied alternating voltage signals to the mirror electrodes. This pulse width modulation to control the degree of reflectivity can then be a direct function of the conditions measured by the light sensors. Also, the time in which the ambient sensor is in dawn/dusk transition can be controlled by a timer or clock when that function is included in the display section of the mirror.

Figure 6:
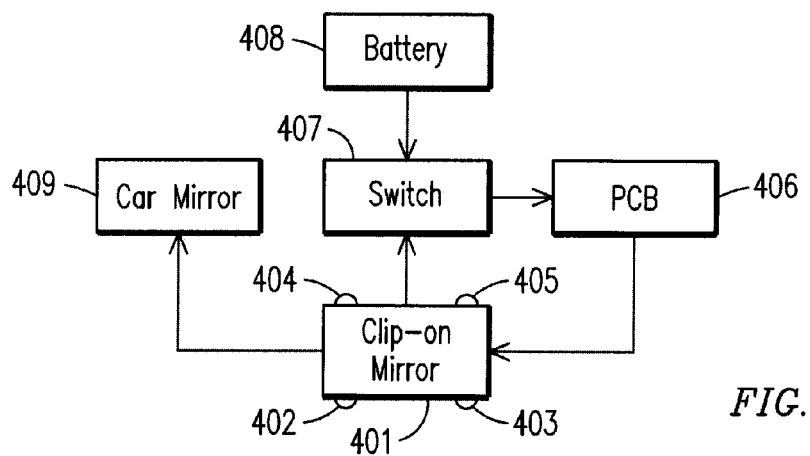
FIG. 6 illustrates one configuration of a Clip-On LC mirror.

FIG. 6 shows one embodiment of a mounting mechanism for mounting a Clip-On embodiment of the LC mirror 401 to and existing rearview mirror 409. Movable arms or clips 402 and 403 slide up and down in corporation with the stationary arms 404 and 405 for clamping the LC mirror 401 onto the existing mirror 409 of a vehicle. The movable mounting arms or clips 402 and 403 preferably are biased to their retracted positions by springs inside the case of the mirror 401. Although in the present demonstration, the two movable arms are located at the bottom of the mirror case, they can be positioned either on the top or at the bottom of the mirror case. To mount mirror 401 onto mirror 409, the movable arms are extended, the fixed arms 404 and 405 are positioned atop (or on bottom) the existing mirror, and the movable arms released causing them to retract partially and thus clamp onto the bottom (or top) of the mirror 409

The batteries 408, which are inside the case of the mirror 401, can be connected and disconnected automatically from the circuit by a miniature switch 407 that detects when the mirror 401 is or is not attached to mirror 409. For example, the switch 407 can be configured to be open when arm 402 or 403 is in its fully retracted position, meaning that the mirror 401 is not attached to existing mirror 409, and closed when arm 402 or 403 is extended, indicating that the mirror 401 is attached to mirror 409. As the mirror 401 is attached to the existing mirror 409, switch 407 applies battery power to the control board 406. In this way, battery power is not depleted when the mirror 401 is not in use during storage or transportation. Also, the TD function is incorporated into the mirror control circuit 406 using low power consumption capacitors for energy conservation.

The Clip-On LC mirror 401 typically operates at a square wave voltage of 4.5 volts or greater at a standby mode of approximately 50 micro-amperes and an operational mode at 200 micro-amperes using typically 3 each alkaline type 1.5 volt batteries in series to provide a supply of 4.5 volts nominal DC output. With a custom designed wire harness, the Clip-on LC mirror can be connected directly to the existing car battery through a power outlet such as the cigarette lighter. Also, the power source can be rechargeable type batteries or solar cells.

The DM type LC mirror can require substantially more energy to operate over time than the BM mirror because the DM mirror must be at its highest reflective BM state most of the time and this state is obtained in the DM mirror by applying an AC voltage signal to the mirror's electrodes. As a result, the DM mirror may be more effective for OEM use where power consumption is not a critical issue because the mirror is powered by the car battery. The BM mirror likely will be most efficient for after-market clip-on applications since it draws power from its batteries only at its DM state, which occurs much more rarely than the BM state.

Figure 7:
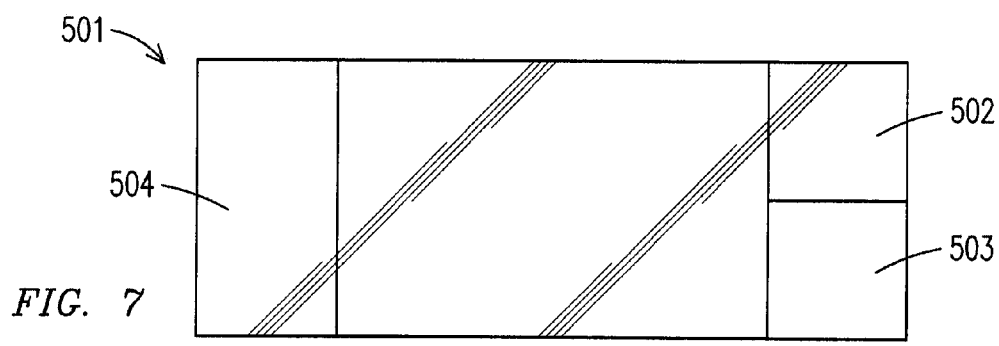
FIG. 7 illustrates optional features for an OEM LC mirror.

FIG. 7 depicts possible added features that may be incorporated in an OEM LC mirror 501 for but not limited to Temperature 502, Compass 503, and Graphic Display 504. Other features such as clock, bluetooth, garage opener, tire pressure indicator, etc. also can be incorporated in the mirror, if desired. The temperature function may include interior and exterior temperatures. The graphic display 504 may present a back-up camera view, a message center, and/or GPS information.

Figure 8:
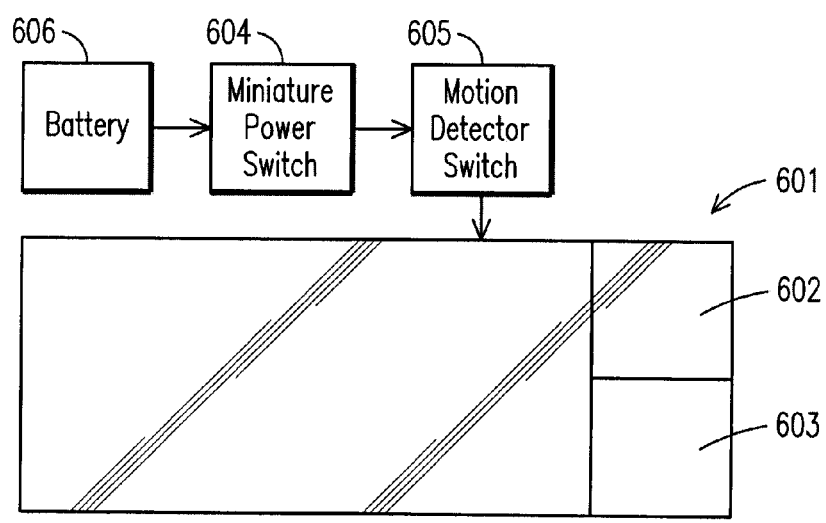
FIG. 8 illustrates optional features for a Clip-On LC mirror.

FIG. 8 presents possible added features for an after-market Clip-On LC mirror 601 for but not limited to Temperature 602 and Compass 603. Other low power consumption features such as clock, bluetooth, garage opener, tire pressure indicator, etc. also can be incorporated in the mirror, if desired. A miniature manual power switch 604 and a Motion Detector switch 605 are additional energy saving devices for the Clip-On LC mirror since the battery 606 can be disconnected manually through the power switch or automatically by the motion detector as the dimming function is not needed when a vehicle is not in motion.

As described above, the ambient light sensor determines daylight conditions from night conditions. The headlight sensor is in the active mode only when the ambient sensor detects darkness or an otherwise low light condition. This functionality is achieved through the logic circuitry as described above. If the headlight sensor then detects a bright headlight behind the vehicle, the oscillator will apply an AC voltage to the electrodes of the LC mirror to make the mirror less reflective and thereby to reduce the glare from the trailing vehicle headlights. Rather than having a simple on/off function for the oscillator, the voltage level detected by the headlight sensor also can vary the duty cycle of the oscillator so the degree of reflectivity or glare reduction can be more for brighter lights and less for lights that are less brilliant. As a result, the mirror can be dimmed gradually to different reflection levels automatically responding to the light detected by the headlight sensor. This feature has been successfully demonstrated in the LCD mirror of the present invention but is not possible in prior art electrochromic dimming mirrors.

Additionally, as also discussed, the comparator that determines the activation level for the ambient sensor has a time delay of a few seconds so that the circuit does not vacillate during the transition from light to darkness or from darkness to light at dusk and dawn times. An alternative technique for eliminating this unstable transition is to include a hysteresis in the comparator, so that the level from low to high is lower than that from high to low. A transition gap is built into the electronics to minimize excessive on/off of the ambient state.

Various prototype LC mirrors in both the OEM and Clip-On configurations have been constructed and tested by the inventors. The size of the prototypes varies from mirrors for small cars up to seven inch by 16 inch mirrors for long haul trucks. Prototypes in both DM and the BM configurations have been tested and demonstrated to be successful. Mirror systems have been built and proven to be capable of switching the mirrors back and forth from bright to transparent neutral black or blue color. These prototypes have been proven to be viable review mirror products in OEM and after-market applications.

Various features, aspects, additions, deletions, and modifications of the forgoing disclosure may be recognized by skilled artisans within the scope of the invention. Some possible examples are listed below.

1. The LC mirror cell is composed of a transparent front and a reflective or transflective back substrates made of material including but not limited to glass and plastics.

2. The bottom surface of the front substrate of the LC mirror in 1 is deposited with a transparent conductive thin film made of material including but not limited to Indium-Tin Oxide (ITO) or Tin-Oxide.

3. The top surface of the LC mirror front substrate in I is deposited with a UV protection coating including but not limited to an inorganic optical thin film made of multilayer oxide materials or laminated with a UV protective polymer film.

4. The UV protective coating in 3 also can be made of an organic coating formulated with materials including but not limited to the UV absorption reagents such as Tinuvin compounds by Ciba Specialty Chemicals Corporation or Uvinul materials by BASF Corporation. The content of the UV absorption reagents is 2-15% in a polymer base carrier.

5. An inorganic type AR optical coating including but not limited to the hybrid oxide thin films is deposited on the top surface of the UV protection coating in 3 and 4 for cutting the light reflectance at and above 410 nm from the front surface of the LC mirror cell to reduce visible light reflection.

6. The UV protective polymer film in 3 can be but is not limited to the products by Nanofilm Co. of Korea. Also film products incorporated with an AR topcoat also are available from the same supplier.

7. The top surface of the back substrate of the LC mirror in 1 is deposited with a high reflective or transflective thin film made of material including but not limited to hybrid thin films of ITO, silicon-oxides, titanium-oxides silver, aluminum, enhanced aluminum, chrome, or other reflective or transflective coatings.

8. The mirror surface in 7 is protected with a transparent topcoat including but not limited to non-conductive Indium-Oxide, Titanium-Oxide, Titanium-Nitride, or other passivation thin films to protect the reflective coating from degradation.

9. The surface with the transparent conductive thin film in 2 and the surface with the reflective coating in 8 are coated with an alignment material for establishing the LC molecular orientations.

10. The homogeneous alignment for the LC molecules of the mirror cell in 1 is established by the material including but not limited to the PI, Polyvinyl Alcohol, or other appropriate organic compounds.

11. The homeotropic alignment for the LC molecules of the mirror cell in 1 is established by the material including but not limited to organic compounds with straight carbon side chains or chains of C4-C30 in length.

12. The mirror cell gap in 1 including but not limit to 3-12 microns in thickness.

13. The LC mirror cell in 1 is filled with a dichroic LC fluid.

14. For Dark-Mode mirror application, the dichroic LC fluid in 10 includes a dichroic dye mixture dissolved in a LC mixture with a positive dielectric anisotropy constant $\Delta \in$.

15. For Bright-Mode mirror application, the dichroic LC fluid in 11 includes a dichroic dye mixture dissolved in a LC material with a negative dielectric anisotropy constant $\Delta \in$.

16. The dichroic LC fluids of 14 and 15 are composed of three base color dyes including but not limit to red, blue, and yellow. The overall dye composition of the LC fluids in 14 and 15 is but not limit to 0.8 to 4.5% with 0.1 to 4.0% for each individual dye component.

17. The order parameters of the dye-LC molecule pair in 14 and 15 are between but not limited to 0.7-0.9.

18. The LC mirror in 1 assembled with 2 through 17 is in a flat configuration.

19. The LC mirror in 1 assembled with 2 through 17 also can be in a curved configuration.

20. The LC mirror in 18 can be made in black Dark-Mode or Bright-Mode type.

21. The LC mirror in 18 can be made in blue Dark-Mode or Bright-Mode type.

22. The LC mirror in 19 can be made in black Dark-Mode or Bright-Mode type.

23. The LC mirror in 19 can be made in blue Dark-Mode or Bright-Mode type.

24. The light reflectance of the LC mirrors in 18 through 23 is monitored automatically by electronic means.

25. The electronic mirror control system in 24 comprises an ambient light sensor incorporated with a headlight sensor.

26. The ambient light sensor in 25 is designed to inhibit the reduced reflection feature during daylight hours of operation.

27. The ambient light sensor in 25 is equipped with an optical filter to maximize its sensitivity toward the ambient daylight and minimize its sensitivity toward the artificial headlights of on-coming traffic.

28. The sensitivity of the ambient sensor in 26 and 27 is set to correspond to ambient light levels at about but not limit to 15 minutes prior to sunset.

29. The sensitivity of the headlight sensor in 25 is set to be substantially the same as that of the ambient sensor in 26 and 27.

30. A time delay of but not limit to 2-6 second using resistor circuit is incorporated into the control logic of 28 for the ambient sensor to minimize mirror flickering during low overcast ambient environment during daytime and driving on uneven pavements or in heavy traffic conditions at night or in low light conditions, also at dusk or dawn time when the ambient light level may overlap with the headlight level.

31. The headlight sensor in 29 is designed to minimize its sensitivity toward the ambient daylight and maximize its sensitivity toward the artificial headlight to prevent the mirror from faults dimming in daytime.

32. A time delay of about but not limit to 2-6 second using resistor circuit is incorporated into the control logic of 31 for the headlight sensor to inhibit the mirror from flickering at nighttime during heavy traffic conditions and when vehicles are traveling on the uneven payments.

33. The headlight sensor in 32 activates and dims the LC mirror to reduce the glare reflection when a vehicle approaches from behind with bright headlights or high beams.

34. The LC mirror of 1 assembled with the electronic system as covered in 2 through 33 is for production of the interior and exterior rearview mirrors for motor vehicle manufacturers.

35. The LC mirrors in 34 is powered by the main power source in the motor vehicle.

36. With low power consumption, the LC mirrors of 35 are also designed into a self-contained Clip-On configuration powered by dry cell batteries. These LC mirrors can be clipped onto the existing rearview mirrors of motor vehicles.

37. The Clip-On LC mirror in 36 is powered by alkaline or lithium type batteries.

38. The Clip-On LC mirror in 36 also can be powered by rechargeable batteries.

39. The Clip-On LC mirror in 36 also can be powered by solar cells used in conjunction with a charging circuit for a rechargeable battery or super-capacitor.

40. The Clip-On LC mirror in 36 also can be powered by connecting directly to a power outlet, such as but not limit to the existing cigarette lighter in a vehicle.

41. Power supply to the Clip-On mirrors in 36 is interrupted manually by an on/off switch.

42. To conserve power consumption of the dry cell batteries, a miniature switch is installed into the electronic control circuit of the Clip-On mirror in 36 and mounted with a tension spring on to a clipping arm so that power input to the mirror is interrupted when the mirror is not clipped onto to the existing mirror in a vehicle.

43. Power supply to the Clip-On mirrors in 36 is interrupted by a motion detector when the vehicle is in a static or parked mode but power is resumed to the mirror when the motion detector detects motion of the vehicle.

44. A low battery indicator activates when the battery input to the LC mirror of 36 is low.

45. A compass is incorporated into the LC mirrors in 35 and 36 for directional orientation.

46. A thermal sensor is incorporated into the LC mirrors in 35 and 36 for monitoring the external temperature of a motor vehicle.

47. A thermal sensor is incorporated into the LC mirrors in the said 35 and 36 for monitoring the internal temperature of a motor vehicle.

The invention has been described herein in terms of preferred embodiments and methodologies considered by the inventors to represent the best mode of carrying out the invention. It should be understood, however, that a wide variety of additions, deletions, and modifications might be made to the illustrated embodiments by those of skill in the art without departing from the spirit and scope of the invention as set forth in the claims.

What is claimed is:

1. A liquid crystal mirror that darkens in response to headlights impinging on the mirror, the liquid crystal mirror comprising:

a substantially transparent front substrate having interior and exterior surfaces and a substantially transparent and conductive layer on the interior surface of the front substrate;

a back substrate having interior and exterior surfaces and being spaced from the front substrate to define a liquid crystal cell between the interior surfaces of the substrates, and an at least partially reflective and conductive layer on the interior surface of the back substrate;

an alignment compound on opposite sides of and bounding the liquid crystal cell;

a liquid crystal fluid contained within the liquid crystal cell, the liquid crystal fluid including a dichroic dye;

an electronic control circuit coupled to the transparent conductive layer on the front substrate and the reflective conductive layer on the back substrate, the electronic control circuit adapted selectively to apply a voltage signal to the layers to affect the transmittance of the liquid crystal fluid; and a headlight sensor coupled to the electronic circuit for sensing an intensity of light impinging on the mirror, the electronic circuit applying a voltage signal or discontinuing a voltage signal to reduce the transmittance of the liquid crystal fluid in response to a light intensity sensed by the headlight sensor above a predetermined headlight threshold.

2. The liquid crystal mirror of claim 1 and further comprising an ambient light sensor coupled to the electronic control circuit for sensing an intensity of ambient light, the electronic control circuit not responding to signals from the headlight sensor when the ambient sensor senses ambient light intensity above a predetermined ambient threshold.

3. The liquid crystal mirror of claim 2 and wherein the headlight threshold and the ambient threshold are substantially the same.

4. The liquid crystal mirror of claim 2 and wherein the electronic circuit includes time delays applied to signals from the headlight and ambient sensors to prevent rapid changes in the transmittance of the liquid crystal fluid.

5. The liquid crystal mirror of claim 1 and wherein a mirror cell gap between the front substrate and the back substrate ranges from about 3 microns to about 12 microns.

6. The liquid crystal mirror of claim 1 and wherein the alignment compound further comprises an organic solvent.

* * * * *